Aug. 17, 1965   C. O. STECK   3,200,552
INSULATIVE BUILDING BOARD
Filed Oct. 18, 1962

3,200,552
INSULATIVE BUILDING BOARD
Clyde O. Steck, Allison Park, Pa., assignor to St. Regis Paper Company, New York, N.Y., a corporation of New York
Filed Oct. 18, 1962, Ser. No. 231,422
3 Claims. (Cl. 52—593)

This invention relates to improvements in insulative building board, particularly adapted among other possible uses, for sheating in building construction, and to improve wall and building constructions incorporating such board.

In U.S. patent to Clyde O. Steck 3,041,219, reference to which is hereby made, there is disclosed and claimed a weatherproof and thermal insulating sheathing comprising a corrugated web of a relatively rigid moisture permeable material made of paperboard or other organic material, such web having adhesively bonded to each side thereof laminated flat facing sheets formed of like or similar organic material, and with a sheet of light and heat reflective metal foil such as of aluminum bonded to each of the outside surfaces of the product, such foil sheets forming the exposed surfaces of the board and being perforated at closely spaced intervals with fine apertures rendering the board sufficiently permeable to permit moisture laden air of a building interior to seep through and thus escape to the outer atmosphere but at a controlled rate such as to prevent condensation and collection of moisture on or within the sheathing.

The present invention is similarly directed to an insulative board comprised of a like corrugated web with paperboard or the like facing sheets adhered to each side thereof and each of the latter in turn having adhered thereon sheets of metal foil. But in the case of the present invention the foil is not perforated, and also the board is so made that each area or section thereof is provided with edge margins such as effectively to prevent the passage of water vapor from one surface thereof to the other when a wall or wall portion is erected embodying same. Board made in accordance with the present invention is particularly well adapted for use in construction of farm buildings such as housings for poultry, animals and fruit storage as well as for other warehouse purposes, retail establishments, sports arenas and the like where humidity has presented a serious problem with the use of conventional insulating materials such as so-called rockwool or glass fibre which tend to accumulate considerable moisture and whereby such moisture reduces the insulation properties thereof or the accumulated weight of water therein may cause the bulky mass of such conventional insulation materials to sag, drip water or eventually tear loose.

In providing an effective insulation and vapor barrier formed of corrugated paperboard with metal foil on its surfaces, one of the practical problems has been that of insuring that the completed board with the metal foil surfaces thereon will be free of spots or areas where the film has become torn or otherwise interrupted during the steps of manufacture, packing, shipping or handling the board. That is, at some stages in the manufacture of board, other layers of the board of parts of the equipment used will often be dragged over the foil covered surfaces with sufficient pressure and friction to cause tearing of the foil, thus minimizing or destroying its effectiveness as a vapor barrier as well as presenting an unsightly appearance. In accordance with the present invention this difficulty has been overcome with surprising effectiveness by forming small, unperforated protuberances on at least one of the foil covered surfaces of the board at closely spaced intervals, these protuberances being formed by applying embossing pressure to the sheet of paperboard or the like on which the metal foil is adhered before such sheet is adhered to the corrugated medium. Such small, closely spaced protuberances will each present a smooth area of contact with whatever object, such as another area of the board, against which the protuberances will engage when areas of the board are slidably moved over each other or against other objects; with the consequence that instead of friction being applied throughout the area of the foil as would tend to be the case in the absence of these protuberances, the friction is confined to the rounded surfaces of the tiny protuberances; thereby any tearing of the foil due to friction is effectively avoided. The fact that the small protuberances are embossed on the paperboard sheet to which the foil is adhered insures that each of these small protuberances on the foil will be backed by a protuberance in the paperboard underneath and thus effectively supported. At the same time, since the embossing is effected against the paperboard sheet underneath the foil, effective embossing of the protuberances on the foil will be accomplished without danger of puncturing the foil which would not only rupture the vapor barrier but would also give the foil a certain degree of roughness at any puncture points. Any such roughness would tend to cause tearing of the foil on any other like areas of the board which may be brought into frictional contact therewith during the packing and handling of the product.

The formations of the small, closely spaced protuberances on the board in accordance with this invention also lends to the product a pleasingly patterned decorative appearance adapting the board to be used for interior sheathing purposes in buildings such as of the types above referred to. Also in such buildings wherein excessive humidity is prone to occur and which are used for housing poultry among other purposes, substantial amounts of fumes may occur which are of a nature to be corrosive to foil such as aluminum. Hence, is accordance with a preferred example of the invention, the metal foil at least on the surface thereof to be exposed to such conditions, may be coated with any suitable known type of alkaline and acid resistant lacquer such as a nitrocellulose lacquer, preferably of a flame-resistant nature, and which if desired may embody dye material for coloring purposes so that the foil covered surface presents a desirable stipple-like bright surface with any desired shade of color.

Another problem of providing an effective insulative vapor barrier board of the nature herein referred to is that of insuring that the barrier will be free of moisture admitting apertures or interruptions along the principal edges of each section of the board. If an edge of the corrugated construction is left exposed or same is placed edge to edge with another section leaving a crevice therebetween, moisture may penetrate such crevice, and by wicking action penetrate further into the body of the material. Furthermore if as is often desired, one section of the board is to be placed edge to edge with another, the line of juncture may not occur at a location where there is a beam or other support against which the edges can be stapled or otherwise affixed to remain in alignment against sagging or bulging one with respect to the other. And if that occurs, the sheathing will not only present an unsightly appearance at the lines of juncture but the wide crevices may occur permitting admission of moisture. In accordance with the present invention this difficulty is overcome by the provision along one edge of the foil covered board of a relatively firm and rigid blade-like margin of a substantial width adapted to be received within a complementary slot-like formation on the edge of the next section of the board. That is, one edge of each section of the board is formed with such a blade-like margin whereas the other edge is formed with a slot-like marginal portion adapted to receive such a blade-like portion on the next section of the board. Thus, when these blade and slot-like marginal portions are interengaged, the lips of the slot-like formation on an edge of one board or panel section will receive and engage the blade-like marginal portion on an edge of the adjacent panel. The inner surfaces of the lips of the slot-like marginal portion may be covered with the metal foil which will engage the metal foil surfaces on the blade-like portion, thereby substantially sealing with a wide seal, the marginal edges of adjacent panels in a moisture-proof relationship without the necessity of applying any securing or fastening means for holding the margins together in such sealed relation. Furthermore, such engaging marginal portions have a stiffness comparable to other portions of the panels so that the joints between panels need not necessarily be made to occur upon supporting trusses, rafters or the like, and yet such marginal portions will be adequately resistant against relative bulging.

As in the case of the above mentioned patent, a high wet strength fiberboard material is preferably used for forming the corrugated medium and the fiberboard plies adhered thereto. For example, as disclosed in said patent, the pulp used for making such fiberboard may embody mellamine-formaldehyde or urea-formaldehyde resins in considerable percentages and the fiberboard used as well as the foil used may be of thickness also as disclosed in said patent. Also, if greater rigidity and strength is desired, a double wall board construction may be employed, i.e. embodying two corrugated webs of the fiberboard separated by a middle ply of fiberboard only, the metal foil being laminated only to the outer surface fiberboard plies in the manner shown in said patent.

Various further and more specific objects, features and advantages of the invention will appear from the description given below, taken in connection with the accompanying drawings illustrating a preferred form of the invention.

Figure 5:
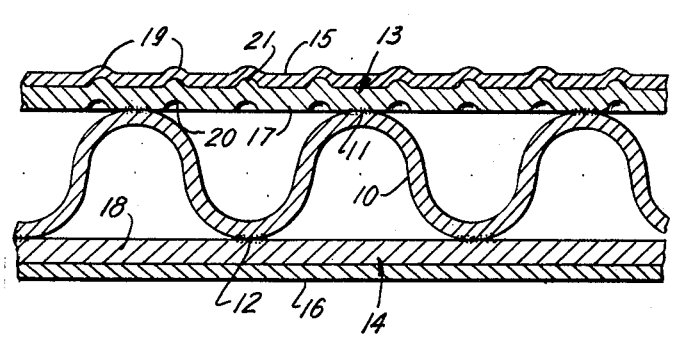
FIGURE 5 is a greatly enlarged cross-sectional view taken along a line such as at 5—5 of FIGURE 4.

Referring to the drawings in further detail, and more particularly for the moment to FIGURE 5, the corrugated medium or web 10 is shown as adhesively bonded along the rib portions thereof on its opposite sides as at 11, 12 to laminated foil-fiberboard facing plies as at 13, 14 respectively, each laminated facing ply comprising an outer layer of light and heat reflecting metal foil such as aluminum as at 15, 16 and an inner layer of high wet strength fiberboard as aforesaid as at 17, 18.

Figure 4:
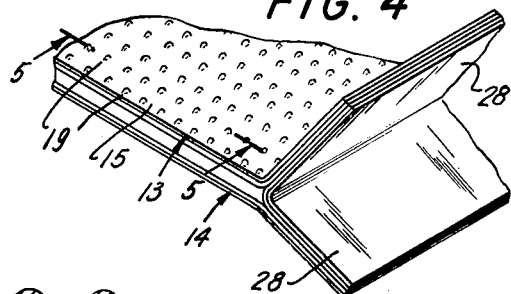
FIGURE 4 is a perspective view showing the slot-like marginal portion of one of the panels with the lips of the slot configuration spread apart.

The foil 15 as best shown in FIGURES 4 and 5, is formed with a multitude of fairly closely spaced protuberances as at 19, each of which is smoothly rounded on its outer surface and each being accompanied by complementary depressions as at 20 on the interior of the fiberboard layer 17. That is, in the process of preparing the foil-fiberboard facing ply 13 and before same is adhered to the corrugated medium 10, same is subjected to an embossing action which may be accomplished as may readily be understood, by passing the laminate for example over a rubber roller while the paperboard ply 17 is being engaged by suitable small rounded pin formations which cause the undersurface of the ply 17 to be indented and its upper surface to be formed with protrusions as at 21, which in turn cause the protuberances 19 to be formed on the foil in smooth condition, free of rupture.

Figure 3:
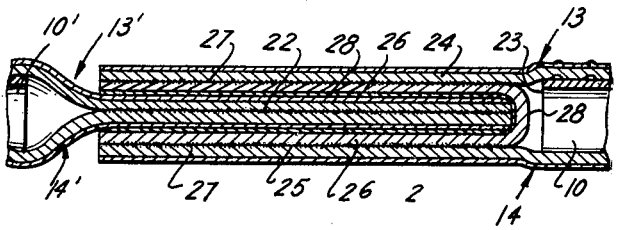
FIGURE 3 is an enlarged transverse sectional view of the engaging blade- and slot-like marginal portions of two of the panels made in accordance with the invention.

As will be apparent from FIGURES 3 and 4, the areas of the corrugated medium contained in each panel section are formed of lesser width than the foil-fiberboard facing laminates 13 and 14 so as to provide for the above mentioned blade- and slot-like interlocking marginal portions. That is, as shown in FIGURE 3, marginal portions 13′ and 14′ on one of the board panels extend out beyond the corrugating medium 10′ for example, to a distance of about one inch more or less as measured in the direction of the corrugations in the corrugated medium. And these extended foil-fiberboard marginal portions are brought together and adhered as along line 22 to form the above-mentioned blade-like marginal portion.

On the adjacent panel, as shown in FIGURE 3, the corrugating medium 10 is discontinued as indicated at 23 but the foil-fiberboard facing laminates 13, 14, are continued as at 24, 25 to form portions of the lips of the slot-like configuration. These lips have interposed therebetween a lapped strip of high wet strength fiberboard of U-shaped cross-section as indicated at 26 and the inner edge of this lapped strip is in a position to be located astride and to embrace the inner edge therein of the blade-like formation. This strip of U-shaped cross-section may have its outer surface adhered as at 27 to the inner surfaces of the lips 24, 25. Furthermore, the inner surfaces of the lapped strip 26 preferably have adhere thereto so as to be entirely covered thereby, a layer of the aluminum or other foil as indicated at 28, such foil extending preferably entirely over the upper and lower surfaces of the blade-like formation as well as around and astride the inner edge of the latter as shown in FIGURE 3.

Thus, the foil on the exterior surfaces of the blade formation comes into frictional engagement over a considerable area directly with the foil on the interior of the lapped strip 26, thereby effectively sealing the marginal portions of adjacent panels against passage of moisture. The lip portions 24, 25 together with the lapped strip 26 therebetween preferably are so formed as to tend to more or less resiliently retain the slot formation in closed condition so that when the blade-like formation on the next panel is inserted therein, the resulting interlocked marginal portions of the two panels will lie flat and provide a sufficiently rigid zone so that no supporting beams or other supporting means need be provided along the joints between panels in the completed sheathing.

Figure 1:
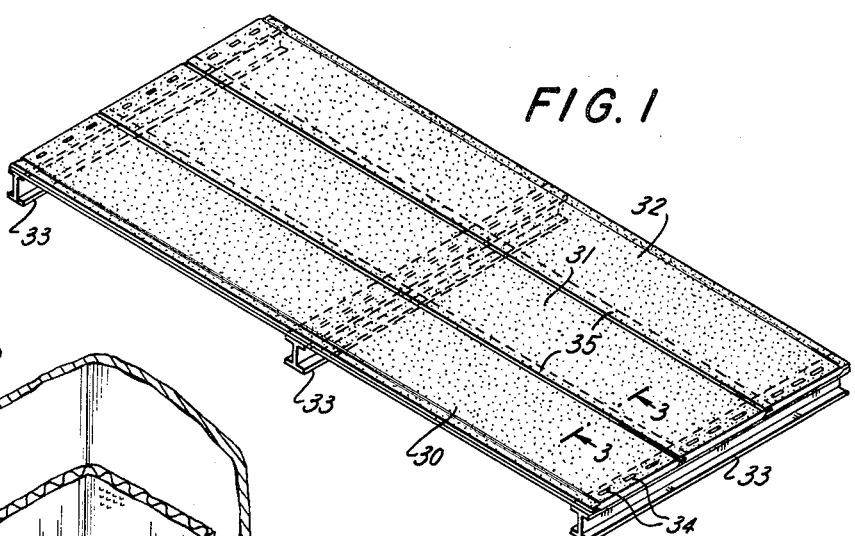
FIGURE 1 is a perspective view showing a plurality of board panels made in accordance with the invention and secured in place to supporting beams for forming a portion of a wall or the like of a building.

For example, as shown in FIGURE 1, a plurality of panels as at 30, 31, 32 are shown with their marginal edges in interlocked relation as above described, each of the panels being secured to beams or other supports at spaced intervals as at 33 by the use of any suitable known form of fastening means as indicated at 34, yet the interlocked marginal portions as at 35 need not be backed or supported by any structural elements.

Figure 2:
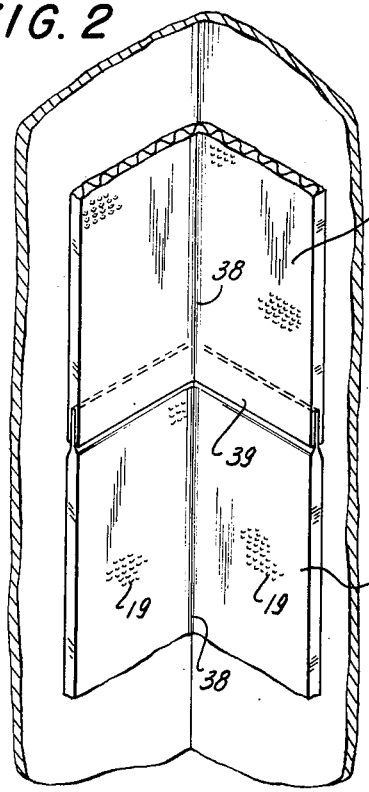
FIGURE 2 is a perspective view showing portions of two panels partly broken away, of insulative board as applied for example to the inner corner portion of a building to provide sheathing therefor.

The insulative board made in accordance with this invention may be readily bent without fracture or rupture of the foil along desired lines by as much as 90° or more so as to conform to corner portions of a structure either internally or externally thereof. For example, as shown in FIGURE 2, two of the board panels are shown partially broken away as at 36, 37 and are being bent along a line as at 38 so as to provide sheathing for an internal corner portion of a building. The interlocking blade and slot portions as here shown at 39 may also be readily bent to conform with the corner line 38 without fracture and without interruption of the metal foil on the surfaces of the parts.

As above explained, if for example the insulative board is to be used in places where the foil may be subject to corrosive fumes, the outer surface of the foil may be coated with a suitable chemical-resistant and preferably relatively flameproof lacquer. A variety of such lacquers are readily available on the market, one example being that known under the trade name "Adcotes 137" put out by Adcote Chemicals Inc. of Elk Grove Village, Illinois. Also such lacquers are preferably per se rather transparent so as to reveal therethrough the bright surface of the foil and same may be tinted with any suitable known dyes and when applied for example to the foil on the surface of the board which face inwardly of the building and which bears the protuberances, the board will present a somewhat stippled and shiny but suitably tinted surface of pleasing appearance.

The completed sheathing provides a board which will be suitably fire-resistant, particularly because heat will be readily reflected away therefrom even if the foil is lacquer-coated. The foil on both surfaces of the board in conjunction with the corrugated fiberboard therebetween serves as an unusually effective insulation against exterior heat or cold while the foil layers provide a double barrier against access of moisture to the fiberboard interior of the panels and prevent the latter from becoming susceptible to fungi, disease germs and insects.

Since one or both surfaces of the board may be readily protected against tarnishing or etching by fumes, the colored surfaces thereon will remain and contribute to more efficient lighting possibilities within buildings. Also, the board provides effective acoustical resistance to external noises.

Although a preferred embodiment of the invention is herein disclosed for purposes of explanation, further modifications thereof after study of this specification may be apparent to those skilled in the art to which the invention pertains. Reference should accordingly be had to the appended claims in determining the scope of the invention.

What is claimed and desired to be secured by Letters Patent is:

1. As a new article of manufacture, insulative and generally flat building board for forming substantially moisture impervious sheathing, comprising: a corrugated paperboard web, said web having adhesively bonded to opposite sides thereof respectively, laminated facing sheets each formed of a sheet of paperboard and an outer sheet of light and heat reflecting imperforate metal foil bonded thereto, said facing sheets including the foil thereon extending at opposite edges of the board beyond the corrugated web to provide marginal extensions, such extensions at one edge of the board being adhered together to provide a relatively rigid blade-like marginal portion, such extensions at another edge of the board providing spaced apart lips, providing a slot-like formation adapted to receive such a blade-like portion on another board-like panel, a strip of material having a U-shaped cross section, said strip being adhered within such slot-like formation, and the inner surfaces of said U-shaped strip being of metal foil, said strip being in a position to be astride of and to embrace with its inner surfaces of metal foil such a blade-like formation on another board panel when inserted therein, the foil on at least one of said laminated facing sheets has small closely spaced protuberances thereon with smooth surfaces free of rupture for reduced friction and consequent possibilities of rupture of the foil when the generally flat board is slidably engaged by another like area thereof or another object, each of said protuberances being supported by the corresponding protuberance on the paperboard sheet thereunder.

2. Insulative building board as in claim 1 wherein said strip of material having a U-shaped cross section is formed of organic sheet material.

3. Insulative building board as in claim 1 wherein the exposed foil surface thereof is provided with a coating of alkaline and acid-resistant lacquer.

References Cited by the Examiner
UNITED STATES PATENTS

| | | | |
|---|---|---|---|
| 2,009,056 | 7/35 | Schaffert | 20—92 X |
| 2,091,918 | 8/37 | Finck | 161—137 X |
| 2,221,310 | 11/40 | Gazelle | 229—3.5 |
| 2,264,961 | 12/41 | Ward | 20—4 |
| 2,264,976 | 12/41 | Heritage | 20—4 |
| 2,359,633 | 10/44 | Ferguson | 50—452 |
| 2,530,124 | 11/50 | Kieckhefer | 229—1.5 |
| 2,563,352 | 8/51 | Morse | 206—65 |
| 2,732,886 | 1/56 | Andreoli et al. | 156—206 |
| 3,041,219 | 6/62 | Steck | 161—100 |

FRANK L. ABBOTT, *Primary Examiner.*

MORRIS SUSSMAN, JACOB L. NACKENOFF,
*Examiners.*